(12) United States Patent
Slagsvold et al.

(10) Patent No.: US 8,322,382 B2
(45) Date of Patent: Dec. 4, 2012

(54) COMPOSITE PIPE HAVING NON-BONDED INTERNAL LINER, METHOD AND ASSEMBLY FOR THE PRODUCTION THEREOF

(75) Inventors: Lars Slagsvold, Drammen (NO); Oddgeir Mo, Drammen (NO)

(73) Assignee: Wellstream International Limited, Newcastle-Upon-Tyne (GB)

( * ) Notice: Subject to any disclaimer, the term of this patent is extended or adjusted under 35 U.S.C. 154(b) by 688 days.

(21) Appl. No.: 12/439,836

(22) PCT Filed: Sep. 4, 2007

(86) PCT No.: PCT/IB2007/002546
§ 371 (c)(1),
(2), (4) Date: Mar. 4, 2009

(87) PCT Pub. No.: WO2008/029249
PCT Pub. Date: Mar. 13, 2008

(65) Prior Publication Data
US 2009/0250134 A1 Oct. 8, 2009

(30) Foreign Application Priority Data
Sep. 5, 2006 (NO) .................................. 20063948

(51) Int. Cl.
*F16L 11/04* (2006.01)
*B29C 63/10* (2006.01)

(52) U.S. Cl. ..... 138/137; 138/140; 138/129; 428/36.91; 428/36.9; 156/187; 156/447

(58) Field of Classification Search .................. 138/137, 138/140, 129, 130; 428/36.91, 36.9
See application file for complete search history.

(56) References Cited

U.S. PATENT DOCUMENTS

| | | | |
|---|---|---|---|
| 4,173,670 A * | 11/1979 | VanAuken | 138/123 |
| 4,698,887 A | 10/1987 | Patell et al. | 29/890.14 |
| 5,261,462 A | 11/1993 | Wolfe et al. | |
| 5,758,694 A * | 6/1998 | Friedrich et al. | 138/144 |
| 7,781,040 B2 * | 8/2010 | Coyle | 428/36.91 |
| 2003/0026928 A1 * | 2/2003 | Bryant | 428/36.3 |

FOREIGN PATENT DOCUMENTS

| | | |
|---|---|---|
| EP | 1316830 A2 | 6/2003 |
| GB | 2184512 A | 6/1987 |
| WO | WO97/15775 | 5/1997 |
| WO | WO00/70256 | 11/2000 |
| WO | WO 00/70256 | 11/2000 |
| WO | WO 01/51839 | 7/2001 |
| WO | WO 02/01103 | 1/2002 |

OTHER PUBLICATIONS

PCT/ISA/210—International Search Report—Jan. 31, 2008.
PCT/ISA/237—Written Opinion of the International Searching Authority—Jan. 31, 2008.
Norwegian search report—Mar. 30, 2007.
Search Report from the European Patent Office for corresponding European Application No. EP07825054.5-2424, Sep. 21, 2012, 11 pages.

* cited by examiner

*Primary Examiner* — Patrick F Brinson
(74) *Attorney, Agent, or Firm* — Klarquist Sparkman, LLP

(57) ABSTRACT

A composite pipe including an internal liner and at least one external layer made of a fiber reinforced consolidated thermoplastic material. A heat-resistant material mechanically separates the liner from the at least one external thermoplastic layer. The heat-resistant material forms a non-bonding barrier that is non-bonded to at least one of liner and the adjacent at least one thermoplastic layer. A method and an assembly for producing the composite pipe.

24 Claims, 2 Drawing Sheets

COMPOSITE PIPE HAVING NON-BONDED INTERNAL LINER, METHOD AND ASSEMBLY FOR THE PRODUCTION THEREOF

CROSS-REFERENCE TO RELATED APPLICATIONS

This application claims priority to Norwegian patent application 20063948 filed 5 Sep. 2006 and is the national phase under 35 U.S.C. §371 of PCT/IB2007/002546 filed 4 Sep. 2007.

TECHNICAL FIELD AND PRIOR ART

The present invention relates to a composite pipe comprising an internal liner and at least one external layer made of a fibre reinforced consolidated thermoplastic material. In accordance herewith, the invention refers also to a method and an assembly structured for producing such composite pipe.

The composite pipe in question provides a capacity to withstand liquids and gases at elevated temperatures and pressures, and finds use within different fields of industry where fluids need transporting. The composite pipe is characterized through low weight, high strength and flexibility, and high chemical resistance. Advantageously, though not exclusively, the composite pipe may be employed in flexible risers, flow-lines, pipe-lines, umbilical pipes, or pressure casings for process equipment, containers and structural members within the oil and gas industry.

Composite pipes of the type referred to are known to be produced by winding and solidifying strip- or band-shaped fibre reinforced thermoplastics material about a tubular internal liner which bonds to external thermoplastic layers in result of heat applied in the consolidation process. The fibre reinforced thermoplastic recited above may be a polymer composite which is partially cured and ready for molding, comprising fibres embedded in a matrix of thermoplastic polymer material which solidifies into the shape applied when cooled from a temperature effective for melting of the matrix. The solidifying process is called consolidation. The fibres may extend in essentially the one and same longitudinal direction of the fibre reinforced thermoplastic, in a unidirectional manner.

The composites pipes may be categorized into rigid pipes or flexible pipes. The rigid pipes are typically jointed sections of discrete lengths structured to have high axial and bending stiffness, and are based on bonded composite technology. The flexible pipes typically contain an internal thermoplastic liner reinforced by multiple metallic structural layers/polymer layers, and an external thermoplastic cover. The structural layers comprise discrete strips which are non-bonded so as to be able to mover relative to each other.

Among the prior art available, reference may be made to WO 00/70256 and U.S. Pat. No. 5,261,462. The first mentioned document discloses a lightweight flexible high pressure pipe wherein structural layers consist of a plurality of individual strips of fibre reinforced thermosetting or thermoplastic materials which are not bonded together or to adjacent structural layers. However, this solution teaches that the liner is fully bonded to the structural layers.

U.S. Pat. No. 5,261,462 discloses a flexible composite pipe designed for static on-shore applications within the oil industry. Structural layers made of fibre reinforced thermoplastic strips are wound about an inner layer consisting of a flexible, thermoplastics or elastomer material cylinder. The thermoplastic strips are not bonded together or to adjacent structural layers. Friction reducing material, in the form of polyethylene film strips, is inserted between the structural layers, and also between the cylinder and adjacent thermoplastic layer. Spirally wound protrusions project radially outwardly from the cylinder surface into the adjacent structural layer, separating the strips of friction reducing material in axial direction of the pipe.

None of the prior art documents available teaches a non-bonding temperature barrier effective for mechanically separating the internal liner from external reinforcing structural layers when heat is applied in the solidifying process, as does the present invention.

The conditions under which the composite pipe operates may contain temperature differentials over the pipe wall in the order of several hundred degrees C., high pressures prevailing at substantial sea depths, pipe lengths exceeding kilometer distances, transversal movements and bending causing contra-directional axial loads on the pipe wall layers, torsional loading, etc.

Composite pipes having an internal liner bonded to external thermoplastic layer/layers may suffer the occurrence of cracks formation and uncontrolled partial separation between the internal liner and external thermoplastic layers under the stresses applied in operation. One plausible cause for such separation and cracks formation is the bonding between different materials having different material properties in the structure of the composite pipe wall. The bonding between liner and external thermoplastic layer/layers, typically arising from the solidifying temperature, may also result in residual stresses in the finished product which further increases the risk of uncontrolled separation and cracking. Ultimately, cracking may develop into rupture of the liner wall, causing leak of fluid into or from the liner interior.

SUMMARY OF THE INVENTION

An object of the present invention is thus to reduce or essentially eliminate the drawback related to the pipes structured to have an internal liner bonded to an external thermoplastic pipe wall.

Another object is to provide a composite pipe of improved flexibility and capacity to withstand bending without rupturing.

Still another object is to provide a composite pipe wherein built-in stresses are avoided upon production.

These and other objects are met in a composite pipe structure.

The object of invention is likewise met in a composite pipe as produced through the method and assembly for carrying out the method.

According to the invention, a composite pipe comprises an internal liner and at least one external layer made of a fibre reinforced consolidated thermoplastic material, wherein the liner is mechanically separate from the external thermoplastic layer/layers by means of a heat-resistant material forming a barrier layer which is non-bonded to at least one of liner and adjacent thermoplastic layer/layers. In one embodiment of the invention, the barrier layer is non-bonded to at least one of liner and external thermoplastic layer.

In a preferred embodiment of the invention, the heat-resistant non-bonding barrier layer is applied onto the liner surface.

The barrier layer is formed preferably by a heat-resistant tape applied in helical windings about the liner. The heat-resistant tape may be a synthetic tape structured to withstand temperatures ranging from about 150 degrees C. to about 500 degrees C. without melting. The synthetic tape is structured at least to withstand temperatures within an interval of about 150 to about 450 degrees C. The heat-resistant barrier advantageously comprises fire retardant tapes such as the Megotape® provided by Scapa polymerics, or a PEI (Poly Ether Imide) tape, a resin impregnated glass composite tape, a silicon resin impregnated composite tape, or a comparable synthetics material based tape.

A method for producing the composite pipe of the invention comprises the following steps: feeding a tubular liner in a process direction; applying at least one external layer of helically wound strips of fibre reinforced thermoplastic; and applying heat circumferentially about the fibre reinforced thermoplastic for consolidation. The method is characterized by the step of applying, preferably in advance of applying said external fibre reinforced thermoplastic, a heat-resistant material forming an intermediate non-bonding barrier layer which avoids bonding to at least one of liner and adjacent thermoplastic layer/layers, and which mechanically separates the liner from the external thermoplastic layer. Advantageously, the method comprises the step of applying said barrier layer non-bonded to at least one of liner and external thermoplastic layer.

The method preferably comprises the step of applying the barrier layer onto the liner surface. In the preferred embodiment, the method further comprises the step of applying one or more layers of a heat-resistant tape in helical windings about the liner, in advance of applying at least one external layer of fibre reinforced thermoplastic.

Also preferred, the heat-resistant tape is chosen from a group of composite tapes structured to withstand temperatures ranging from about 150 degrees C. to about 500 degrees C. without melting. The heat-resistant tape is chosen from a group of composite tapes structured at least to withstand temperatures within an interval of at about 150 to about 450 degrees C. The heat-resistant tape is advantageously chosen from a group of fire retardant tapes such as the Megotape® provided by Scapa polymerics, or a PEI tape, a resin impregnated glass composite tape, a silicon resin impregnated composite tape, or a comparable synthetic material based tape.

The method is especially useful for producing composite pipes operating as:
flow-lines for fluid transport;
sub-sea structures in the offshore industry;
pipelines, umbilical pipes, production and injection risers for oil and/or gas and/or water in onshore and off-shore production, e.g.

An assembly for carrying out the method and producing the composite pipe of the present invention comprises: means for feeding a liner in a process direction; a downstream winding mechanism operative for applying an external layer of helically wound strips of fibre reinforced thermoplastic; and a heater operative for applying heat circumferentially about the fibre reinforced thermoplastic for consolidation.

The assembly is characterized by an upstream winding mechanism operative for applying, in advance of said external layer of fibre reinforced thermoplastic, an intermediate barrier layer formed of heat-resistant non-bonding material. Preferably, the upstream winding mechanism is the first winding mechanism in the process direction.

The upstream winding mechanism comprises at least one rotary supply carrying a heat-resistant tape, and means for driving the rotary supply in a revolving path about the liner for winding the heat-resistant tape in helical windings onto the liner surface. The rotary supply/supplies advantageously contain heat-resistant tape structured to withstand temperatures ranging from about 150 degrees C. to about 500 degrees C. without melting. The rotary supply/supplies preferably contain heat-resistant tape structured at least to withstand temperatures within an interval of 150 to at least 450 degrees C. A fire retardant tape such as the Megotape® provided by Scapa polymerics, or a PEI tape, a resin impregnated glass composite tape, a silicon resin impregnated composite tape, or a comparable synthetic material based tape, may advantageously be loaded into the singular or multiple supplies of the upstream winding mechanism.

SHORT DESCRIPTION OF THE DRAWINGS

The invention is more closely explained below with reference made to the accompanying diagrammatic drawings. In the drawings, FIG. 1 is an elevation view illustrating an assembly for producing a composite pipe of the invention;

DETAILED DESCRIPTION OF THE INVENTION AND PREFERRED EMBODIMENTS THEREOF

As used herein, the expression "mechanically separate" refers to a condition where no bonding occurs over the interface between adjacent layers included in the produced composite pipe wall, i.e. the liner is free to move inside the composite structure. The expression "heat-resistant" refers to the capacity of a material to maintain its structural/chemical integrity and to resist shrinking, melting, charring or carbonizing or going into flames, etc., or otherwise deteriorate when subjected to high temperatures, at least in the order of 150 to 450 degrees C. or above. The expression "tape" refers to a band-shaped strip of material, at least one side of which has no adhesive applied thereto.

In the following, the expression "fiber reinforced thermoplastic" refers to a fibres containing thermoplastic matrix which transforms into a solid state through a consolidation process where heat is applied to raise the temperature above the melting point of the thermoplastic matrix, followed by cooling. The fibre concerned may be any suitable fibre such as carbon fibre, glass fibre, or aramide fibre, e.g. The fibres are embedded in a polymer matrix, such as high-density polyethylene, cross-linked polyethylene, polyamide polyvinylidene fluoride, e.g., or any other polymer suitable for thermoforming. The fibres can by embedded in the polymer matrix in the form of woven fabrics, roving, tows, fibre bundles, yarns, or randomly dispersed in the polymer matrix. The fibre reinforced thermoplastic may have a fibre content of 30-80% fibre per volume. Strips of fibre reinforced thermoplastic preferably contain fibres that are uni-directionally embedded in the polymer matrix. A suitable fibre reinforced thermoplastic strip typically has a thickness of about 0.1-0.5 mm. The width transverse to the longitudinal direction of the strip is typically about 1-25 mm. However, other widths, thicknesses, fibre contents, fibre and plastics materials may be applied in a fibre reinforced thermoplastic strip which operates with the method and assembly of the present invention.

The scope of invention also includes the application of fibre reinforced thermosetting matrices in the external layer/layers, if appropriate.

Figure 1:
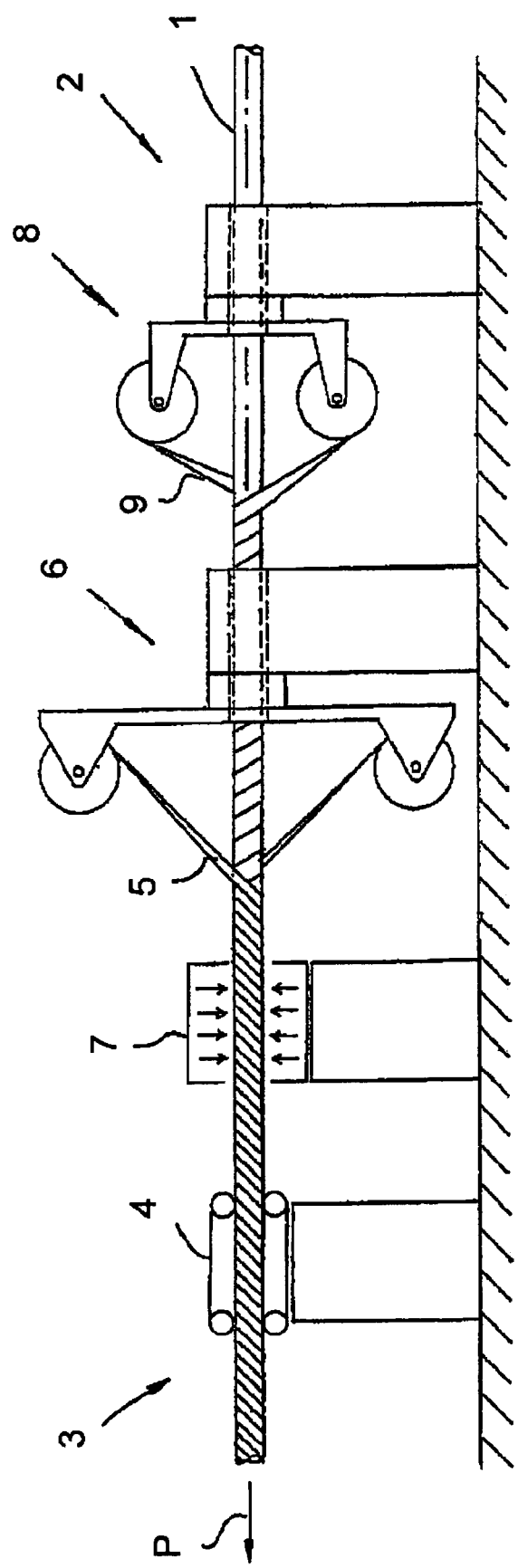

An assembly for carrying out the method resulting in the composite pipe is diagrammatically illustrated in FIG. 1. With reference to FIG. 1, a tubular liner 1 is advanced in a process direction P from an entrance end 2 of the assembly to an exit end 3 thereof. The liner feed is controlled by feeder means 4 arranged at the exit end, typically comprising gripper wheels or gripper bands engaging the exterior of the composite pipe. The liner 1, the length of which is unspecified or continuous, has a smooth outer surface and is conventionally produced from synthetic materials. The liner 1 may be extruded from thermoplastics material to have, typically, a circular hollow section.

At least one supply of fibre reinforced thermoplastic strips 5 is carried in a winding mechanism 6 arranged and driven for revolving motion about the liner 1, downstream of an entrance end 2 as viewed in the process direction P. The structure of a winding mechanism 6 typically comprises a rotating member rotationally journalled in a base member, as well as drive means for revolving the rotating member onto which one or several supplies of fibre reinforced thermoplastic strips are carried on rotary spools. Preferably, at least two supplies of fibre reinforced thermoplastic strips are carried on the winding mechanism 6, which typically operates for winding the strips 5 in helical paths about the liner 1 until a desired layer thickness is achieved, as known per se. Naturally, two or more winding mechanisms 6 may be arranged in succession along the process path.

Downstream of the winding mechanism 6, a heater 7 is arranged to supply heat circumferentially about the wound strips of fibre reinforced thermoplastic. The heater 7 is effective for raising the temperature in the wound strips 5 sufficiently to reach the melt point temperature of the polymer matrix. Any suitable heating source known in the art is available for a heater 7, such as electromagnetic radiation, infrared radiation, laser radiation, microwave radiation, or hot gases, open flames, contact heat or vibration, e.g. by means of ultra sound, or electrical resistance, or through any suitable combination thereof.

In the heater, consolidation pressure may be provided by means of pressure rollers running against the periphery of the external thermoplastic layer. Alternatively, sufficient pressure may be provided from a back-tension applied to the strips upon winding, and assisted eventually from an anisotropic thermal expansion of the fibre reinforced thermoplastic strips typically having a thermal expansion coefficient in the thickness direction which is considerably larger than the same in a longitudinal direction of the strips.

The heater 7 is positioned upstream of feeder means 4 at a distance there from sufficient to ensure sufficient cooling and consolidation of the fibre reinforced thermoplastic downstream of the heater, before reaching the feeder means 4 which engages a consolidated section of the composite pipe for feeding. If appropriate, a cooler (not illustrated) may be arranged downstream of the heater 7.

An additional winding mechanism 8 is arranged upstream of the fibre reinforced thermoplastic strips winding mechanism 6. This upstream winding mechanism 8 carries at least one supply of heat-resistant tape 9 and operates for winding one or more layers of heat-resistant tape about the liner 1. In the drawing of FIG. 1, the upstream winding mechanism 8 is the first one seen in the process direction P, which is the preferred embodiment by which the heat-resistant tape 9 is applied in helical windings directly onto the liner surface, i.e. in advance of application of the fibre reinforced thermoplastic strips of external layers.

Thus according to the invention, an intermediately positioned heat resistant barrier layer is included in the produced composite wall structure of the pipe, which barrier mechanically separates the internal liner from external layer/layers. Preferably, the barrier layer is supported on the liner surface.

The benefits of the invention may however be employed also if application of the barrier layer is preceded by an upstream treatment of the liner 1. Such treatment may comprise any form of coating applied to the inner or outer sides of the liner wall as required by operating conditions of the composite pipe.

Figure 2:
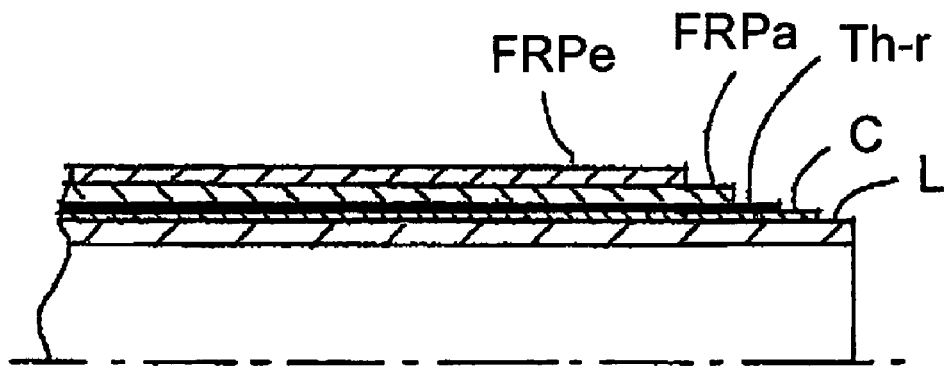
FIG. 2 is a diagrammatic, cut-away upper section of a composite pipe of a first embodiment.

With reference to FIG. 2, a composite pipe according to the present invention may comprise, in radial direction from the pipe's longitudinal centre, a liner wall L, a surface coating C (which can be a fibre reinforced thermoplastic coating, if appropriate), the heat-resistant tape Th-r, an external fibre reinforced thermoplastic layer FRPe and additional thermoplastic layers FRPa below the external layer FRPe. An optional inside coating of the liner wall is excluded from the drawing. In this embodiment, the heat-resistant tape is non-bonded to at least one adjacent thermoplastic layer, forming a non-bonding barrier which separates the liner mechanically from the external thermoplastic layer/layers.

Figure 3:
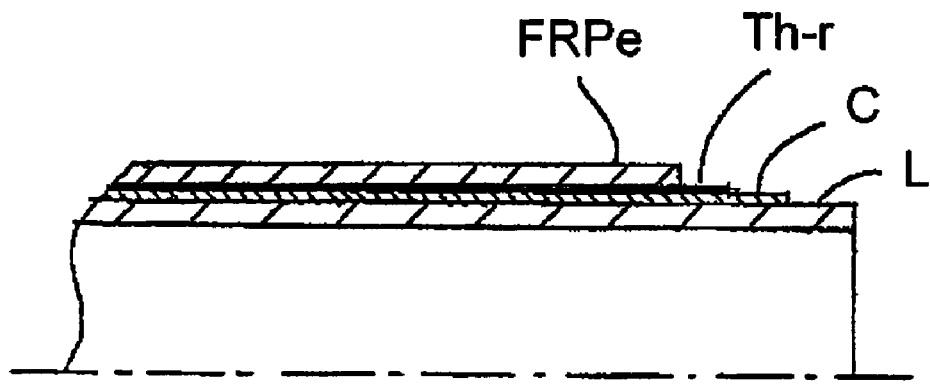
FIG. 3 is a corresponding view showing a second embodiment of the composite pipe of FIG. 2.

With reference to FIG. 3, the composite pipe includes the liner wall L, the surface coating C, the heat-resistant tape Th-r, and external fibre reinforced thermoplastic layer FRPe. As apparent from the drawing, this embodiment provides a heat-resistant barrier layer which is non-bonded to at least the external thermoplastic layer FRPe.

Figure 4:
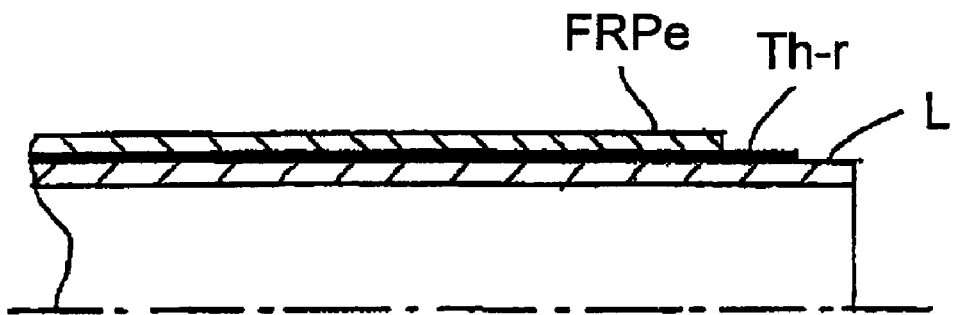
FIG. 4 is a diagrammatic, cut-away upper section of a composite pipe of a third and preferred embodiment of the present invention.

With reference to FIG. 4, the composite pipe includes the liner wall L, the heat-resistant tape Th-r applied onto the liner surface, and at least one external fibre reinforced thermoplastic layer FRPe. In this preferred embodiment, the heat-resistant tape may be arranged non-bonded to one or both of the liner and the external thermoplastic layer FRPe.

The heat-resistant tape 9 can be of any suitable material meeting the requirement of avoiding bonding to adjacent thermoplastic layer/layers in the solidifying process. Synthetic tapes meeting this requirement are available. At least the upper side of the heat-resistant tape has no adhesive applied thereto.

Among operable products available, mentioned as a suitable example not excluding comparable alternatives, is Megotape®, PEI (Poly Ether Imide) tape, glass composite tapes, composites which are impregnated with a high temperature resistant silicon resin, etc. These tapes are used industrially as fire retardant barriers in electrical cables. The tapes provide high tensile strength and flexibility, making them suitable for high speed taping equipment. The Megotape/PEI tape/glass composite tape can withstand temperatures up to about 500° C. or above. The tapes remain non-effected from the temperatures of typically about 100 to about 400° C., generated in the solidifying process.

Through the above method a composite homogenous pipe can be produced that avoids any residual stress in or between liner and composite layers, as otherwise is the case in bonded composite structures.

Modifications to the detailed design are possible within the scope of invention as defined through the appended claims. Thus, it will be appreciated by a man skilled in the art, that each of the features disclosed in subordinated claims will contribute to the advantages of the invention also in other combinations than those expressively outlined in the subordinated claims.

The invention claimed is:
1. A composite pipe, comprising:
an internal liner and
at least one external layer comprising a fibre reinforced consolidated thermoplastic material, a heat-resistant material mechanically separating the liner from the at least one external thermoplastic layer, wherein the heat-resistant material forms a non-bonding barrier layer which avoids bonding to at least one of liner and the adjacent at least one thermoplastic layer.

2. The composite pipe according to claim 1, wherein the barrier layer is non-bonded to at least one of liner and the at least one external thermoplastic layer.

3. The composite pipe according to claim 1, wherein the barrier layer is applied onto a surface of the liner.

4. The composite pipe according to claim 3, wherein the barrier layer comprises at least one layer of heat-resistant tape applied in helical windings circumferentially in contact with the liner surface.

5. The composite pipe according to claim 4, wherein the heat-resistant tape comprises a composite tape structured to withstand temperatures ranging from about 150 degrees C. to about 500 degrees C. without melting.

6. The composite pipe according to claim 4, wherein the heat resistant tape comprises a synthetic material based tape.

7. The composite pipe according to claim 4, wherein the heat-resistant tape is a tape selected from the group of fire retardant tapes, silicon resin impregnated composite tapes, glass composite tapes, Megotapes, or PEI tapes.

8. A method of forming a composite pipe, the method comprising:
feeding a tubular liner in a process direction;
applying at least one external layer of helically wound strips of fibre reinforced thermoplastic;
applying heat circumferentially about the fibre reinforced thermoplastic for consolidation; and
applying heat-resistant material forming an intermediate non-bonding barrier layer which avoids bonding to at least one of the liner and the at least one thermoplastic layer, and which mechanically separates the liner from the external at least one thermoplastic layer.

9. The method of claim 8, further comprising:
applying said barrier layer non-bonded to at least one of the liner and the at least one external thermoplastic layer.

10. The method according to claim 9, further comprising:
applying the barrier layer onto a surface of the liner.

11. The method according to claim 10, further comprising:
applying a heat-resistant tape in helical windings about the liner in advance of applying at least one external layer of fibre reinforced thermoplastic.

12. The method according to claim 11, wherein the heat-resistant tape is chosen from a group of composite tapes structured to withstand temperatures ranging from about 150 degrees C. to about 500 degrees C. without melting.

13. The method according to claim 11, wherein the heat-resistant tape is chosen from a group of tapes comprising fire retardant tapes, silicon resin impregnated composite tapes, glass composite tapes, Megotapes, or PEI tapes.

14. The method according to claim 8, wherein the composite pipe produced is a flow-line for fluid transport.

15. The method according to claim 8, wherein the composite pipe produced is a sub-sea structure in the offshore industry.

16. The method according to claim 15, wherein the composite pipe produced is a production or injection riser for oil and/or gas and/or water.

17. The method according to claim 15, wherein the composite pipe produced is an umbilical pipe.

18. An assembly for producing a composite pipe comprising an internal liner and at least one external layer comprising a fiber reinforced consolidated thermoplastic material, a heat-resistant material mechanically separating the liner from the at least one external thermoplastic layer, wherein the heat-resistant material forms a non-bonding barrier layer which avoids bonding to at least one of liner and the adjacent at least one thermoplastic layer, the assembly comprising;
a liner feed configured to feed a liner in a process direction;
a downstream winding mechanism operative for applying an external layer of helically wound strips of fibre reinforced thermoplastic;
a heater operative for applying heat circumferentially about the fibre reinforced thermoplastic for consolidation; and
an upstream winding mechanism operative for applying, in advance of said external layer of fibre reinforced thermoplastic, an intermediate barrier layer formed of heat-resistant non-bonding material.

19. The assembly according to claim 18, wherein said upstream winding mechanism is the first winding mechanism in the process direction.

20. The assembly according to claim 19, wherein said upstream winding mechanism comprises at least one rotary supply carrying a heat-resistant tape, and a drive configured to drive the rotary supply in a revolving path about the liner for winding the heat-resistant tape in helical windings onto the liner surface.

21. The assembly according to claim 20, wherein the rotary supply contains heat-resistant tape structured to withstand temperatures ranging from about 150 degrees C. to about 1000 degrees C. without melting.

22. The assembly according to claim 20, wherein the rotary supply contains a synthetics material based tape.

23. The assembly according to claim 20, wherein the rotary supply contains any tape in the group of fire retardant tapes, silicon resin impregnated composite tapes, glass composite tapes, Megotapes, or PEI tapes.

24. The composite pipe according to claim 1, wherein the barrier layer comprises a composite tape capable of maintaining its structural and chemical integrity when subjected to temperatures ranging from about 150 degrees C. to about 500 degrees C.

* * * * *